United States Patent
Girkin et al.

(10) Patent No.: US 6,193,401 B1
(45) Date of Patent: Feb. 27, 2001

(54) OPTICAL ELEMENT

(75) Inventors: John Michael Girkin, Dunbartonshre; Martin David Dawson, Glasgow, both of (GB)

(73) Assignee: University of Strathclyde, Glasgow (GB)

(*) Notice: Subject to any disclaimer, the term of this patent is extended or adjusted under 35 U.S.C. 154(b) by 0 days.

(21) Appl. No.: 09/367,422

(22) PCT Filed: Feb. 13, 1998

(86) PCT No.: PCT/GB98/00326

§ 371 Date: Aug. 30, 1999

§ 102(e) Date: Aug. 30, 1999

(87) PCT Pub. No.: WO98/36295

PCT Pub. Date: Aug. 20, 1998

(30) Foreign Application Priority Data

Feb. 15, 1997 (GB) .................................................. 9703156

(51) Int. Cl.[7] ................................. F21V 7/04; G02B 6/00; G09F 13/00
(52) U.S. Cl. ........................... 362/551; 362/556; 362/560; 362/308; 362/328; 362/555; 385/901; 385/33; 385/49; 385/93
(58) Field of Search ..................................... 362/551, 555, 362/556, 560, 328, 308, 327; 385/900, 901, 33, 49, 93

(56) References Cited

U.S. PATENT DOCUMENTS

| 4,266,534 | * | 5/1981 | Ogawa | 128/6 |
| 4,752,123 | * | 6/1988 | Blaker | 351/161 |
| 5,099,399 | * | 3/1992 | Miller et al. | 385/15 |
| 5,491,765 | * | 2/1996 | Matsumoto | 385/33 |

FOREIGN PATENT DOCUMENTS

0733923 A1    9/1996  (EP) .

* cited by examiner

*Primary Examiner*—Sandra O'Shea
*Assistant Examiner*—Ali Alavi
(74) *Attorney, Agent, or Firm*—Alston & Bird LLP

(57) ABSTRACT

The light emitted by diodes of the Gallium Nitride type which comprises two distinguishable emissions is controlled by a single optical element (10) in the form of a lens having a central part and an annular part with different optical powers. The total output light of the diode may be collimated or brought to a common focus. The single optical element is preferably injection moulded and the annular part takes the form of a diffraction lens. The first part (12) is preferably a refractive lens which has a different optical power to the second part (14) which is preferably a diffractive lens. The optical power of the refractive lens (12) (the first optical power) and the optical power of the diffractive lens (14) (the second optical power) are selected to match the light source that the lens (10) is to be used with.

4 Claims, 2 Drawing Sheets

OPTICAL ELEMENT

BACKGROUND OF THE INVENTION

The present invention relates to a single optical element, in particular to a lens suitable for use with a particular type of light emitting diode (LED) structure.

FIELD OF THE INVENTION

A typical structure of one specific type of LED is shown in FIG. 1a. The light emitting material is housed in a cup-shaped reflector. The light emitted from such an LED has two spatial components, as shown in FIG. 1b, one of the components (the central component labelled L1) arises from direct emission from the top face of the LED, the other (the component around the perimeter labelled L2) arises from the sides of the LED and is reflected by the cup-shaped reflector. These two components are separated by an area with substantially no emission (labelled D1) and which although illustrated as circular need not be circular. The light L1 emitted from the top face of the LED typically accounts for only about 20% of the total light output.

The effect of having direct emission from the top surface of the LED and indirect (reflected) emission from the sides of the LED is that the device appears to have two light sources, S1, S2 as shown in FIG. 1c. One source (s1) is for the direct emission L1 from the top surface; the second source (s2) is for the indirect emission L2, and appears to be behind the LED device. Thus, the second source (s2) is a virtual source.

The light pattern from the direct emission L1 is a narrow beam of light; whereas the light pattern from the indirect emission L2 is an annular beam surrounding and spaced from the direct emission. The light emission from the type of LED structure shown in FIG. 1, has a highly divergent component (the indirect emission) L2 and is spatially inhomogeneous. Thus it is difficult to use this type of LED as an effective optical source of collimated or focused light. It will also be appreciated that certain forms of conventional lamp sources display similar characteristics of spatially inhomogeneous emission.

SUMMARY OF THE INVENTION

It is an object of this invention to obviate or mitigate the above disadvantage.

The general solution to the above problem is to use in combination with an LED or other source as previously described a single optical element which has two optical powers, one of the optical powers is used to focus or collimate one component of the LED emission, the other optical power is used to focus or collimate the other component of the LED emission; thus the two spatial components of the LED emission can be collimated or brought to a common focus.

One advantage of the present invention is that it allows a significant proportion of the light emitted from such an LED or other source to be focused or collimated onto another optical element (e.g. a waveguide such as an optical fibre which would homogenise the beam profile, or a combiner), making this type of LED or other source a convenient light source for many optical applications which have previously used laser sources.

According to a first aspect of the present invention there is provided a single optical element comprising a first part with a first optical power and a second part with a second optical power, where the second part is disposed around the perimeter of the first part.

It will be understood that the single optical element is to be used with an optical source such as the previously described LED producing both a narrow beam of light and an annular beam of light, and one of the parts is used to focus or collimate the narrow beam of light and the other part is used to focus or collimate the annular beam of light, the first and second optical powers being selected to ensure that the narrow beam of light and the annular beam of light are brought to a common focus or are collimated.

The first part may be either a refractive or a diffractive lens. The second part also may be either a refractive or a diffractive lens. It is also preferred that the single optical element is manufactured by injection moulding.

According to a second aspect of the present invention there is provided a single optical element according to the first aspect of the invention in combination with a light source that produces direct and reflected light, where the direct light is a narrow beam, and the reflected light is an annular beam, the combination producing at a common focus or in common collimation both direct and reflected light.

According to a third aspect of the present invention there is provided an optical system comprising at least two single optical elements according to the first aspect of the present invention and arranged to produce collimated beams, each single optical element being associated with a LED or other source as previously described as its input, a combiner to combine the output of each optical element, and an output lens arranged to focus the combiner output to a common focus.

Preferably, each of the LEDs (or other sources) emits light of a different colour.

It will be understood that by varying the emission intensity of each of the coloured LEDs the colour produced at the output of the combiner can be varied, thus a specific spectral output characteristic can be produced by the system. Alternatively the differently coloured LEDs may be switched on in turn for use as part of a scanning system.

These and other aspects of the invention will become apparent from the following description when taken in combination with the accompanying drawings in which:

BRIEF DESCRIPTION OF THE DRAWINGS

FIG. 1b is a diagrammatic view of the two components of light emission from an LED of FIG. 1a;

FIG. 2b schematically shows a side view of the single optical element of FIG. 2a;

DETAILED DESCRIPTION OF THE PREFERRED EMBODIMENTS

Figure 1A:
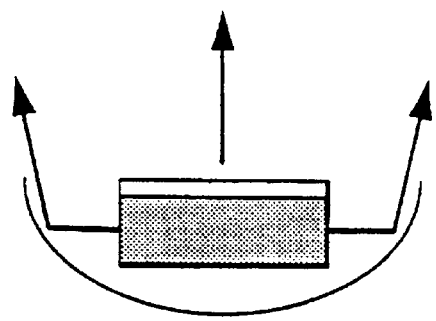
FIG. 1a is a sectional view of a known specific type of LED device.
Figure 1C:
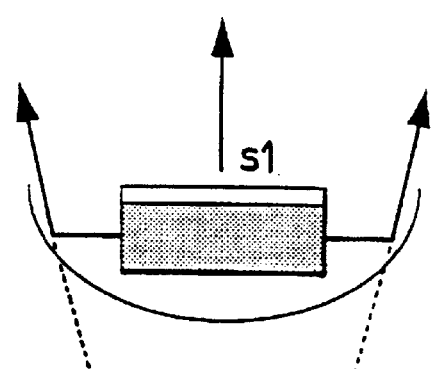
FIG. 1c is a sectional view of the LED device of FIG. 1a showing the source (s1) of the direct emission and the apparent source (s2) of the indirect emission.
Figure 1B:
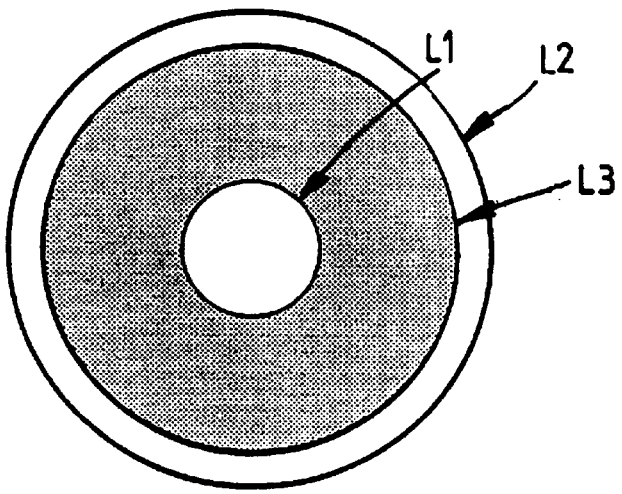

FIG. 1a shows the specific type of LED structure which is used in embodiments of the present invention and which is representative of certain other forms of conventional lamp sources. An example of the specific type of LED structure which is used in embodiments of the present invention is the Gallium Nitride or GaN LED available from Nichia Chemical Company. This type of LED has a single quantum—well emitting—region and it emits light of narrow bandwidth (for example 10 nm spectral linewidth) and high power (for example several milliwatts). FIG. 1b shows the two components of light emission (L1 and L2) that are characteristic of the specific type of LED structure shown in FIG. 1a. 1c shows the source S1 and the apparent source S2 that give rise to the two components of light emission of FIG. 1b.

Figure 2A:
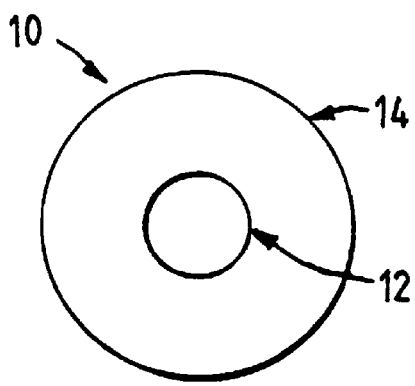
FIG. 2a schematically shows a front view of a single optical element with two parts in accordance with the present invention.
Figure 2B:
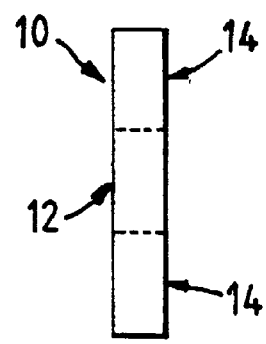

Referring to FIGS. 2a and 2b, which show two views of a single optical element, the optical element is a dual focal-length lens 10 which has two integral parts. The first part 12 is generally circular and is located at the centre of the lens 10, the second part 14 is annular and is disposed around the perimeter of the first part 12.

The first part 12 is preferably a refractive lens which has a different optical power to the second part 14 which is preferably a diffractive lens. The optical power of the refractive lens 12 (the first optical power) and the optical power of the diffractive lens 14 (the second optical power) are selected to match the light source that the lens 10 is to be used with, as will be described with reference to FIG. 3.

Figure 3:
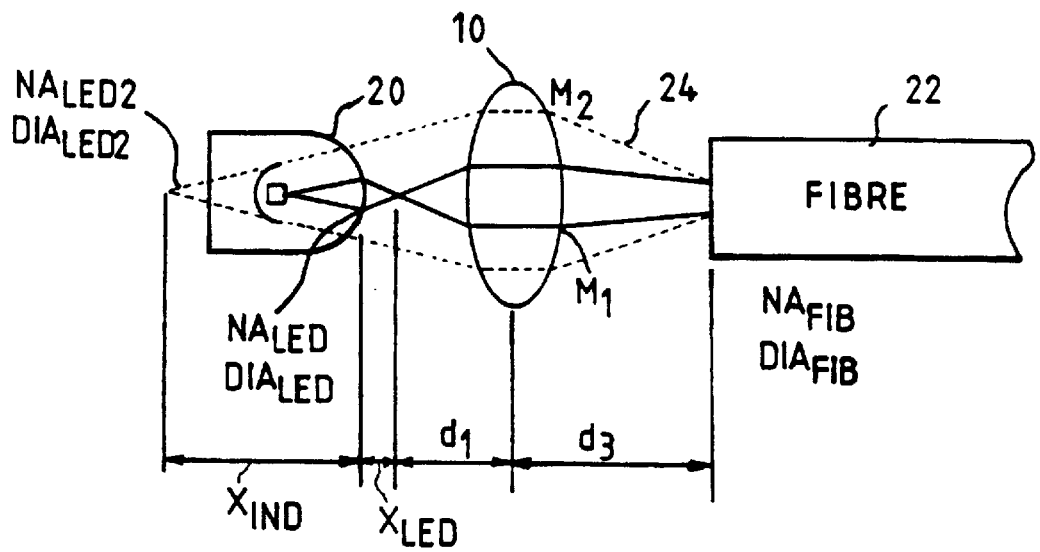
FIG. 3 shows the optical element of FIG. 2 focusing the light emission from an LED to an optical fibre according to one aspect of the invention.

FIG. 3 shows the lens 10 focusing the light emission from an LED 20 into an optical fibre 22 according to one aspect of the invention. To achieve maximum coupling of the light from the LED 20 into the optical fibre 22 both the spot size and the angle (numerical aperture) of the output from the lens 10 (the lens output 24) should be matched to the aperture of the optical fibre 22. Only the numerical aperture needs to be matched in this embodiment because typically the spot size is smaller than the aperture of the fibre 22 (and of course the product of numerical aperture and spot size is invariant).

The required lens magnification (RLM) equals the numerical aperture (NA) of the LED divided by the numerical aperture (NA) of the optical fibre, as given by equation 1:

$$RLM = \frac{LED\ NA}{Fibre\ NA} \quad (1)$$

and the required focal length is given by equation 2:

$$Focal\ Length = \frac{RLM * (Object\ distance + Image\ distance)}{(RLM + 1)^2} \quad (2)$$

Applying equations 1 and 2 to the embodiment of FIG. 3 yields equations 3 and 4 for the direct light case (i.e. light (L7) emitted from the top face of the LED 20).

$$RLM1 = \frac{NA_{LED}}{NA_{FIBRE}} \quad (3)$$

$$Focal\ length\ 1 = \frac{RLM1 * (d_1 + d_3)}{(RLM1 + 1)^2} \quad (4)$$

Applying equations 1 and 2 to the embodiment of FIG. 3 yields equations 5 and 6 for the indirect light case (i.e. light (L2) emitted from the sides of the LED then the reflector):

$$RLM2 = \frac{NA_{LED}}{NA_{FIBRE}} \quad (5)$$

$$Focal\ length\ 2 = \frac{RLM2 * (d_1 + x_{LED} + x_{IND} + d_3)}{(RLM2 + 1)^2} \quad (6)$$

Typical values for the parameters in equations 1 to 6 are given in Table 1 for a GaN LED. Using equations 3 to 6 with values of the desired distance from the LED 20 to the lens 10 and the desired distance from the lens 10 to the optical fibre 22, the required values of the first optical power and the second optical power can be calculated. Optical power, of course, is the inverse of focal length.

Figure 4:
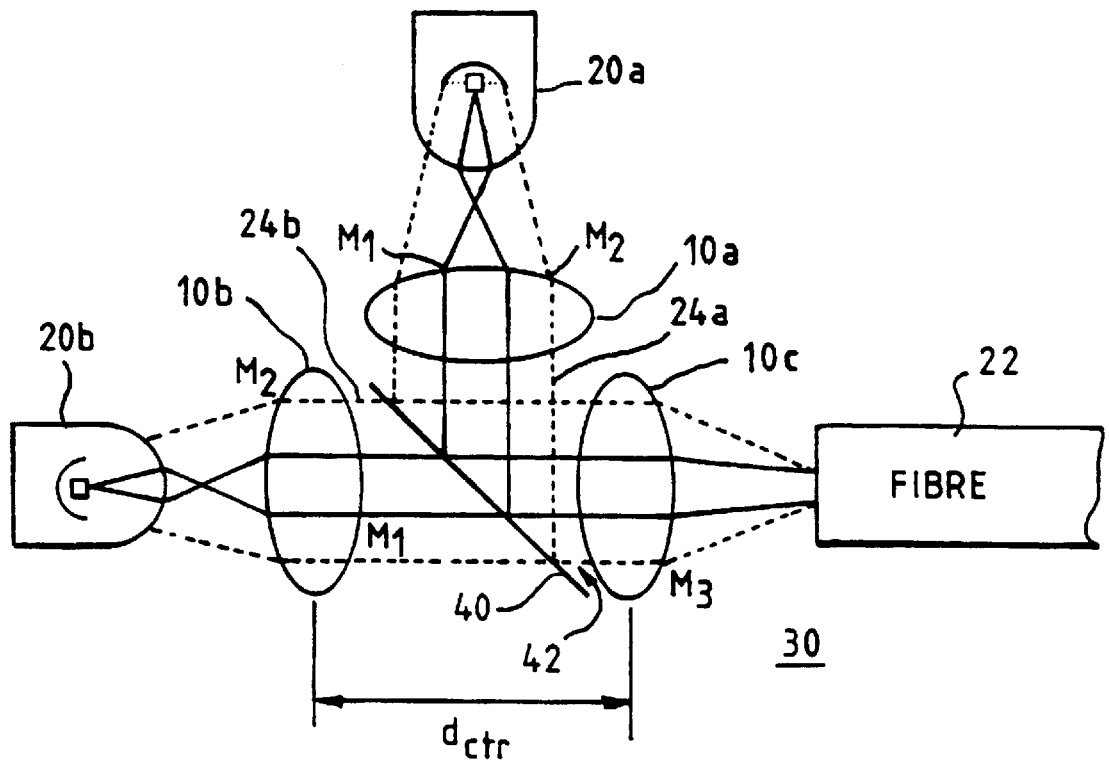
FIG. 4 shows an optical system for combining the outputs of two LEDs using the optical element of FIG. 2 according to another aspect of the invention.

FIG. 4 shows an optical system 30 for combining the outputs of two LEDs according to another aspect of the invention. The system 30 has a first LED 20a with a corresponding first lens 10a, and a second LED 20b with a corresponding second lens 10b. The output of the first lens (the first lens output 24a) and the output of the second lens (the second lens output 24b) are both collimated beams. These collimated beams are input to a combiner 40 which transmits the second lens output 24b and reflects the first lens output 24a to produce a collimated output 42 which is a combination of the first and second lens outputs 24a,b and which is delivered to an output lens 10c, preferably an achromatic lens, arranged to focus the combined lens outputs 42 into the optical fibre 22. Lens 10c may be a singlet or may be multi-element and is a single focal length lens. Additional lenses may be included, for example, in the path of the first lens output 24a or in the path of the second lens output 24b. Thus diffraction gratings or dichroic mirrors may be used to combine the emission from several LEDs.

The two LEDs (20a, 20b) emit light at different wavelengths, for example, the first LED 20a preferably emits red light, the second LED 20b preferably emits blue light so that by varying the emission intensity of the LEDs, 20a and 20b (by individual controllers, not shown) the colour produced at the output of the combiner 40 can be varied.

Various changes may be made to the above described embodiments within the scope of the present invention. For example, the first part 12 in the lens 10 need not be circular, it may be elliptical or some other shape. This may be required if the LED 20 emits a narrow beam which is elliptical or some other shape. Similarly, the second part 14 need not be circular along its outer periphery, it may be another shape, for example to fit a particular lens holder. The first part may not be a refractive lens, it may be a diffractive lens. Similarly, the second part may not be a diffractive lens, it may be a refractive lens.

In other embodiments of the optical system 30, more than two LED's may be used. For example, a green LED may also be used so that there are red, green and blue LEDs, which are the primary colours, and the system may include means of adjusting the emission intensity of each of the LEDs to produce a collimated output 42 with controllable spectral characteristics. Thus a specific spectral output characteristic can be selected by adjusting the emission intensity of each of the LEDs. This can be achieved by increasing or decreasing the drive voltage or current of each individual LED to make the emission from that LED more or less intense. In other embodiments of the optical system 30, the two LEDs may not emit red and blue light, they may emit light of other wavelengths (including infrared).

In other embodiments of the invention an array of LEDs, each of which emits blue light, is used to cure dental composite material. A holographic diffusing material may be used in combination with the lens 10 to produce a homogenous light distribution which provides uniform curing of the dental composite material.

In other embodiments of the invention an array of coloured LEDs may be used for applications such as biomedical imaging, cytology, time-resolved fluorescence, and microscopy applications such as fluorescence microscopy.

TABLE 1

| | |
|---|---|
| $NA_{LED}$ = | 0.12 (Direct LED NA) |
| $DIA_{LED}$ = | 0.23 mm (LED Direct Diameter) |
| $NA_{FIBRE}$ = | 0.37 (Typical Fibre NA) |
| $DIA_{FIBRE}$ = | 0.50 mm (Typical Fibre Core Diameter) |
| $NA_{LED2}$ = | 0.20 (Indirect LED NA) |
| $DIA_{LED2}$ = | 0.30 mm (LED Indirect Diameter) |
| $X_{LED}$ = | 12 mm (LED to Focus of Output) |
| $X_{IND}$ = | 13 mm (Emitting Point Behind LED) |

What is claimed is:

1. The combination of an LED and a single optical element, wherein the LED comprises light emitting material housed in a cup-shaped reflector, the light emitting material having a single quantum-well emitting region such that the light emitted from the LED has a first spatial component arising from direct emission from the top face of the LED which is a narrow beam (L1) and a second spatial component arising from the sides of the LED and reflected by the cup-shaped reflector which is an annular beam (L2) and apparently emanating from a virtual source (S2) behind the LED, and wherein the single optical element consists essentially of a first part (12) in the form of a refractive lens with a first optical power and a second part (14) in the form of a diffractive lens with a second optical power, the second part (14) being disposed around the periphery of the first part (12), and the arrangement being such that the combination delivers the direct and reflected beams at a common focus or in common collimation.

2. The combination of claim 1, wherein the LED is a Gallium Nitride LED.

3. The combination of claim 1 or claim 2, wherein the light from the LED is focussed to a common focus, including an optical fibre (22) arranged to receive the focussed light at the fibre input.

4. An optical system comprising at least two of the combinations claimed in claim 1 or claim 2 and wherein the light from each LED is collimated, a combiner (40) being disposed to combine the two collimated beams, an output lens (10c) being arranged to focus the combiner output to a common focus, and the emission intensity of each LED being controlled by an individual controller which varies the drive voltage or current of the LED to produce a desired light characteristic at the common focus.

* * * * *